United States Patent [19]

Jens et al.

[11] Patent Number: 5,341,406
[45] Date of Patent: Aug. 23, 1994

[54] SLIDING LANCE GUIDE FLEXIBLE LANCE SYSTEM

[75] Inventors: Stephen C. Jens, Ashland, Mass.; Bernard Sawaf, deceased, late of Nashua, N.H., by Marilene Sawaf, administratrix.; Paul F. Viola, Sommerville, Mass.; Paul R. Belkus, Whittinsville, Mass.; Robert A. S. Lee, Stoneham, Mass.

[73] Assignee: Electric Power Research Institute, Inc., Palo Alto, Calif.

[21] Appl. No.: 738,469

[22] Filed: Jul. 31, 1991

Related U.S. Application Data

[63] Continuation-in-part of Ser. No. 303,268, Jan. 27, 1989, Pat. No. 5,065,703, which is a continuation-in-part of Ser. No. 27,810, Mar. 18, 1987, Pat. No. 4,827,953, and a continuation-in-part of Ser. No. 314,091, Feb. 22, 1989, Pat. No. 5,036,871, and a continuation-in-part of Ser. No. 661,825, Feb. 27, 1991, Pat. No. 5,286,154, and a continuation-in-part of Ser. No. 695,308, May 3, 1991.

[51] Int. Cl.⁵ .............................. B08B 3/02
[52] U.S. Cl. .................... 376/316; 122/392; 134/172; 165/95
[58] Field of Search .............. 376/316, 310, 260; 122/379, 382, 383, 392; 134/167 R, 172; 165/11.2, 95

[56] References Cited

U.S. PATENT DOCUMENTS

| | | | |
|---|---|---|---|
| 4,424,769 | 1/1984 | Charamathieu et al. | 122/392 |
| 4,715,324 | 12/1987 | Muller et al. | 376/316 |
| 4,827,953 | 5/1989 | Lee | 122/392 |
| 5,036,871 | 8/1991 | Ruggieri et al. | 134/167 R |
| 5,065,703 | 11/1991 | Lee | 122/382 |

*Primary Examiner*—Daniel D. Wasil
*Attorney, Agent, or Firm*—Flehr, Hohbach, Test, Albritton & Herbert

[57] ABSTRACT

A sliding lance guide flexible lance system (10) is attached to a hand hole (12) of a nuclear power plant steam generator by means of flange (14) of tilt module (16). A rail (18) extends from the tilt module (16) to a support stand (20) and is attached to the stand (20) by a pivot (22) so that the rail (18) is free to rotate with the tilt module (16). A tilt drive motor (24) is attached to the tilt module (16). A flexible lance (26) extends into the rail (18) for extension through a lance guide shoe (27). The lance guide shoe (27) deflects the lance from the rail (18) into the tube gap of the steam generator. The lance guide shoe (27) is slideably mounted in the rail (18), and is attached to a lance guide belt (30), which extends within and along the rail (18). Similarly, the flexible lance (26) extends within and along the rail (18). A lance guide belt sprocket drive (40) is mounted on support (33) to engage the lance guide belt (30). A similar flexible lance sprocket drive (42) is mounted on the support (33) to engage the flexible lance (26).

18 Claims, 6 Drawing Sheets

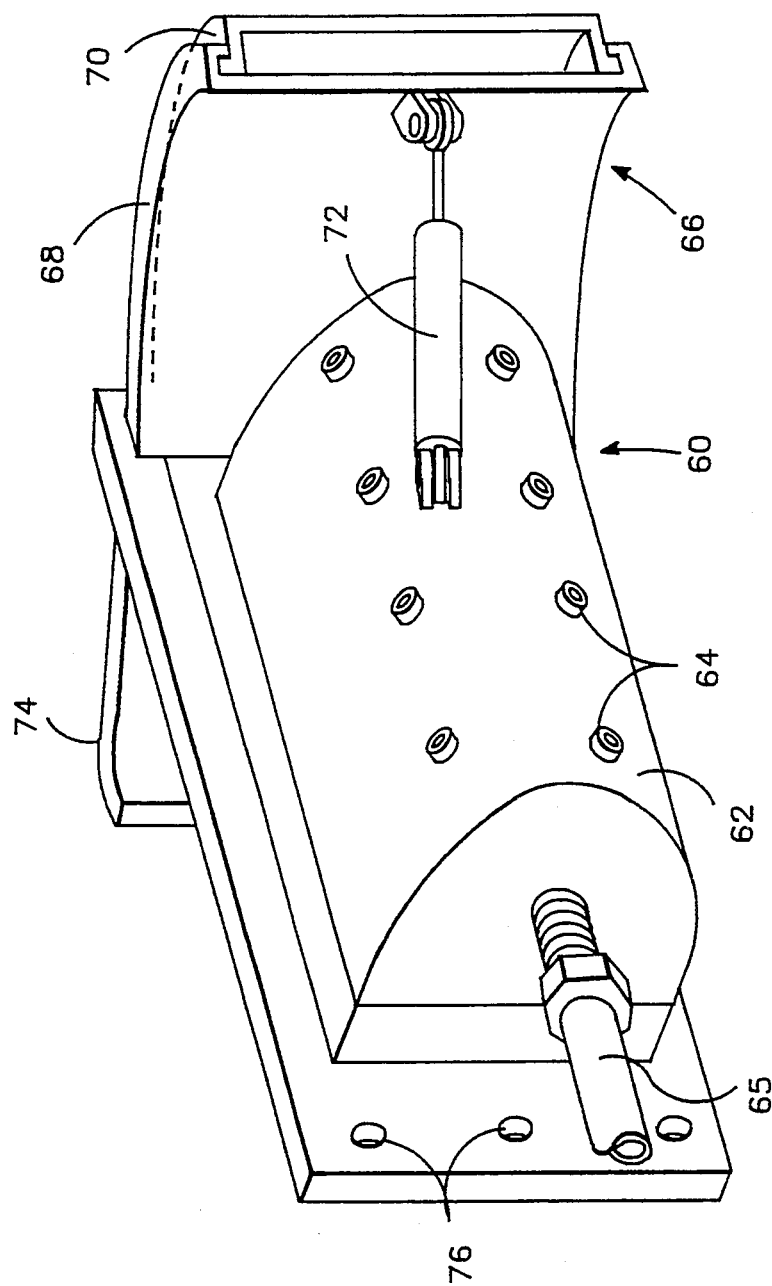
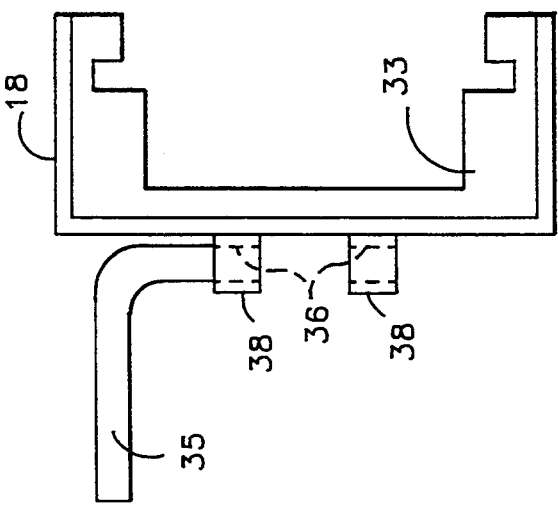
FIG.−6
FIG.−5

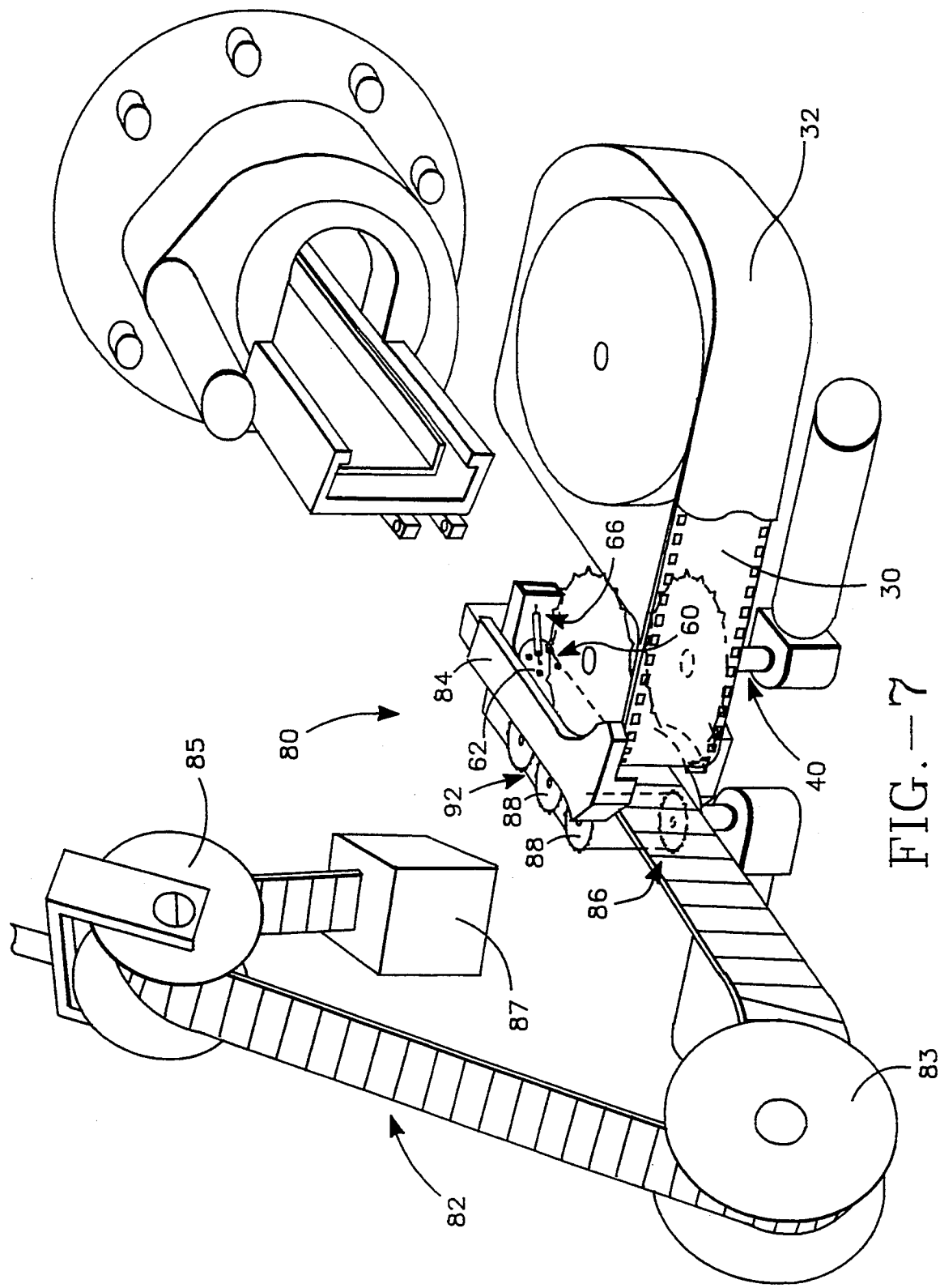
FIG.—7

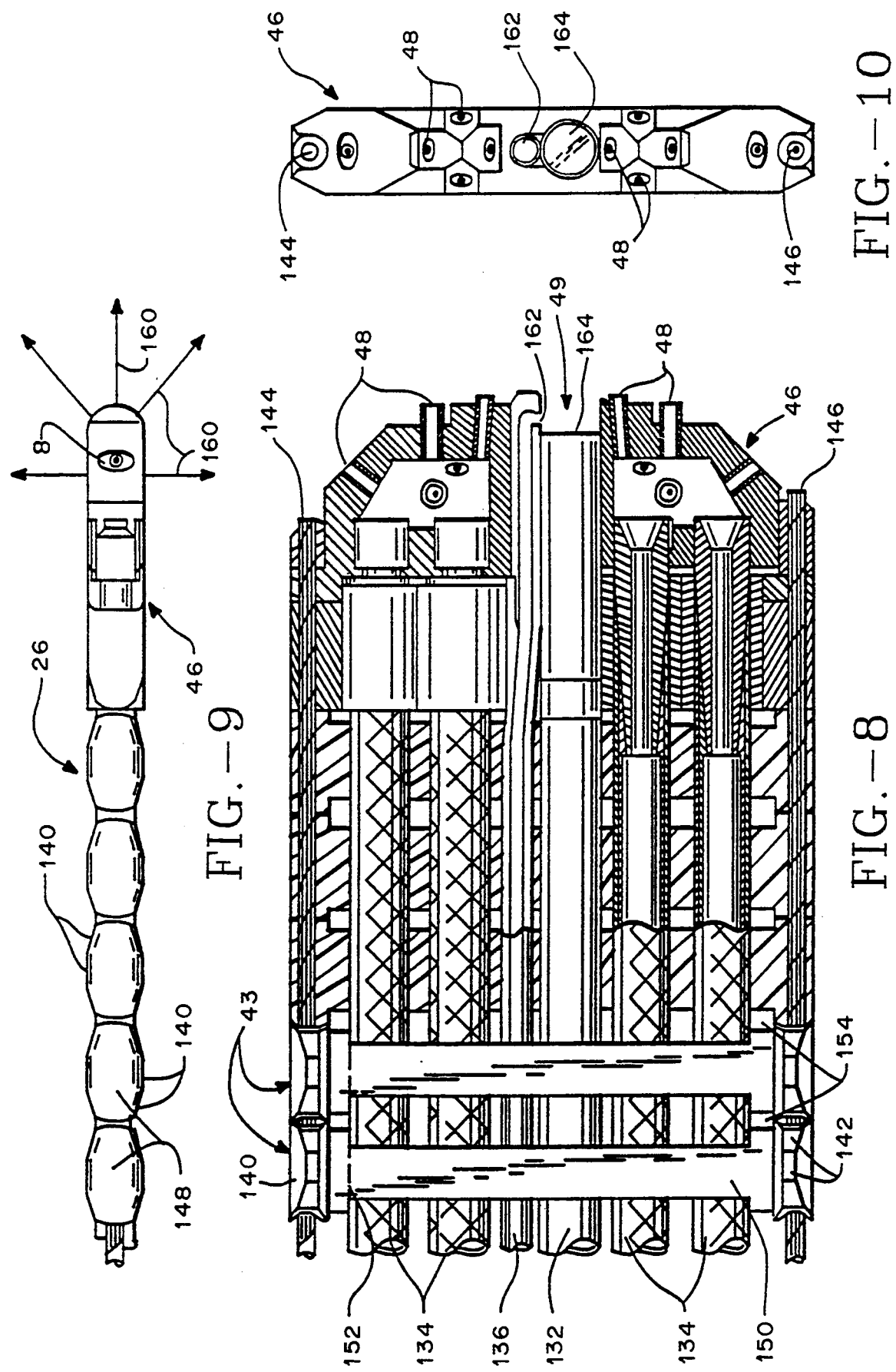

SLIDING LANCE GUIDE FLEXIBLE LANCE SYSTEM

CROSS-REFERENCE TO RELATED APPLICATIONS

This application is a continuation-in-part of commonly assigned application Ser. No. 07/303,268, filed Jan. 27, 1989, now U.S. Pat. No. 5,065,703 in the name of Robert A. S. Lee, which is in turn a continuation-in-part of commonly assigned application Ser. No. 07/027,810, filed Mar. 18, 1987, now U.S. Pat. No. 4,827,953 in the name of Robert A. S. Lee, now U.S. Pat. 4,827,953, both entitled "Flexible Lance for Steam Generator Secondary Side Sludge Removal." This application is further a continuation-in-part of commonly assigned application Ser. No. 07/314,091, filed Feb. 22, 1989, now U.S. Pat. No. 4,827,953 in the names of Steven K. Ruggieri, Stephen C. Jens and Robert Sykes, and entitled "Flexible Lance and Drive System." This application is also a continuation-in-part of commonly assigned application Ser. No. 07/661,825, filed Feb. 27, 1991, now U.S. Pat. No. 5,286,154 in the names of Stephen C. Jens, Michael W. Osborne, Paul F. Viola, Christos Athanassiu and Robert A. S. Lee, and entitled "In Bundle Foreign Object Search and Retrieval Apparatus" and application Ser. No. 07/695,308, filed May 3, 1991 in the names of Stephen C. Jens, Paul F. Viola, Michael W. Osborne, Margarita Golfman and Robert A. S. Lee and entitled "Annular Foreign Object Search and Retrieval Apparatus."

BACKGROUND OF THE INVENTION

1. Field of the Invention

The present invention relates generally to a robotic system that is useful in nuclear power plants and other structures with a difficult to access geometry. More particularly, it relates to such a system which inserts a flexible lance into tube gaps of a steam generator, and similar difficult to access geometries. Most especially, it relates to such a system which is usable with difficult to access geometries having small access ports, known as hand holes in the case of steam generators for nuclear power plants.

In the system as disclosed in the Ruggieri et al. parent application, a flexible lance transporter having drive motors and positioning sensors mounted on the transporter is inserted through an access port known as a hand hole of a steam generator into a blow down lane, which runs down the center of a tube bundle in the steam generator. In order to accommodate the geometry of the transporter and a support rail for the transporter, it is necessary that the hand hole have a diameter which is about three times the height of the flexible lance driven through the flexible lance transporter. Thus, for a flexible lance having a height of two inches, a hand hole having a diameter of six inches is required with the system of the Ruggieri et al. parent application.

A substantial proportion of nuclear power plant steam generators have hand holes of sufficient diameter to accommodate the transporter and its support rail. The flexible lance system as described in the Ruggieri et al. parent application has proved to be of substantial benefit in such steam generators having large enough hand holes to accommodate the transporter and its support rail. However, many such steam generators lack large enough hand holes for this purpose. It would be desirable to provide the benefit of a flexible lance system in steamgenerators lacking such large hand holes as well.

2. Description of the Prior Art

Nuclear power generation equipment of the pressurized water reactor type consists of two major parts, the reactor and the steam generator. The steam generator includes a heat exchanger, which, in simple terms, consists of a bundle of thin wall tubes, which are tightly spaced and arranged in a matrix-like fashion. The spacing between the tubes is less than 0.5 inches, and the tube height extends to tens of feet. Hot reactor coolant is pumped through the tubes, which in turn heats water under pressure above the boiling point to several hundred degrees, thus generating steam.

In the operation of the steam generator, sludge deposits build up between the tubes. The steamgenerator needs to be cleaned periodically in order to remove these sludge deposits.

SUMMARY OF THE INVENTION

Accordingly, it is an object of this invention to provide a flexible lance system for accessing such difficult to access geometries as steam generators of nuclear power plants which is universally applicable to different steam generators and other difficult to access geometries.

It is another object of the invention to provide such a flexible lance system usable with smaller access holes to the steam generators and other difficult to access geometries than previous flexible lance systems.

It is a further object of the invention to provide such a flexible lance system in which it is not necessary to insert drive motors or sensors for the system inside the steam generator or other difficult to access geometry.

It is still another object of the invention to provide such a flexible lance system in which the flexible lance is inserted into the steam generator within, rather than suspended from, a support rail.

The attainment of these and related objects may be achieved through use of the novel flexible lance system herein disclosed. A flexible lance system in accordance with this invention has a flexible means for accessing an assembly having a difficult to access geometry. The flexible means for accessing includes a flexible member having a distal end. The flexible member is configured to be driven into the difficult to access geometry. A rigid guide extending lengthwise of the flexible member and is mounted within a support rail. The flexible member is movably mounted along the rigid guide. The rigid guide has an end positioned to turn the flexible member in a predetermined angle with respect to an extending direction of the flexible member as the flexible member passes from the rigid guide through the end. A first drive means external of the assembly having the difficult to access geometry drives the flexible member through the rigid guide. A second drive means external of the assembly having the difficult to access geometry drives the rigid guide along the support rail.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 5 is a cross section view, taken along the line 5—5 in FIG. 4.

FIG. 6 is a perspective view of an alternative embodiment of the portion of the sliding lance guide flexible lance system shown in FIG. 2.

FIG. 7 is an exploded perspective view similar to that of FIG. 4, but of another embodiment of the sliding lance guide flexible lance system.

FIG. 8 is a side view of the flexible lance shown in FIGS. 1-4 and 7.

FIG. 9 is a top view of the flexible lance of FIG. 8.

FIG. 10 is a front view of the flexible lance of FIGS. 8-9.

DETAILED DESCRIPTION OF THE INVENTION

Figure 1:
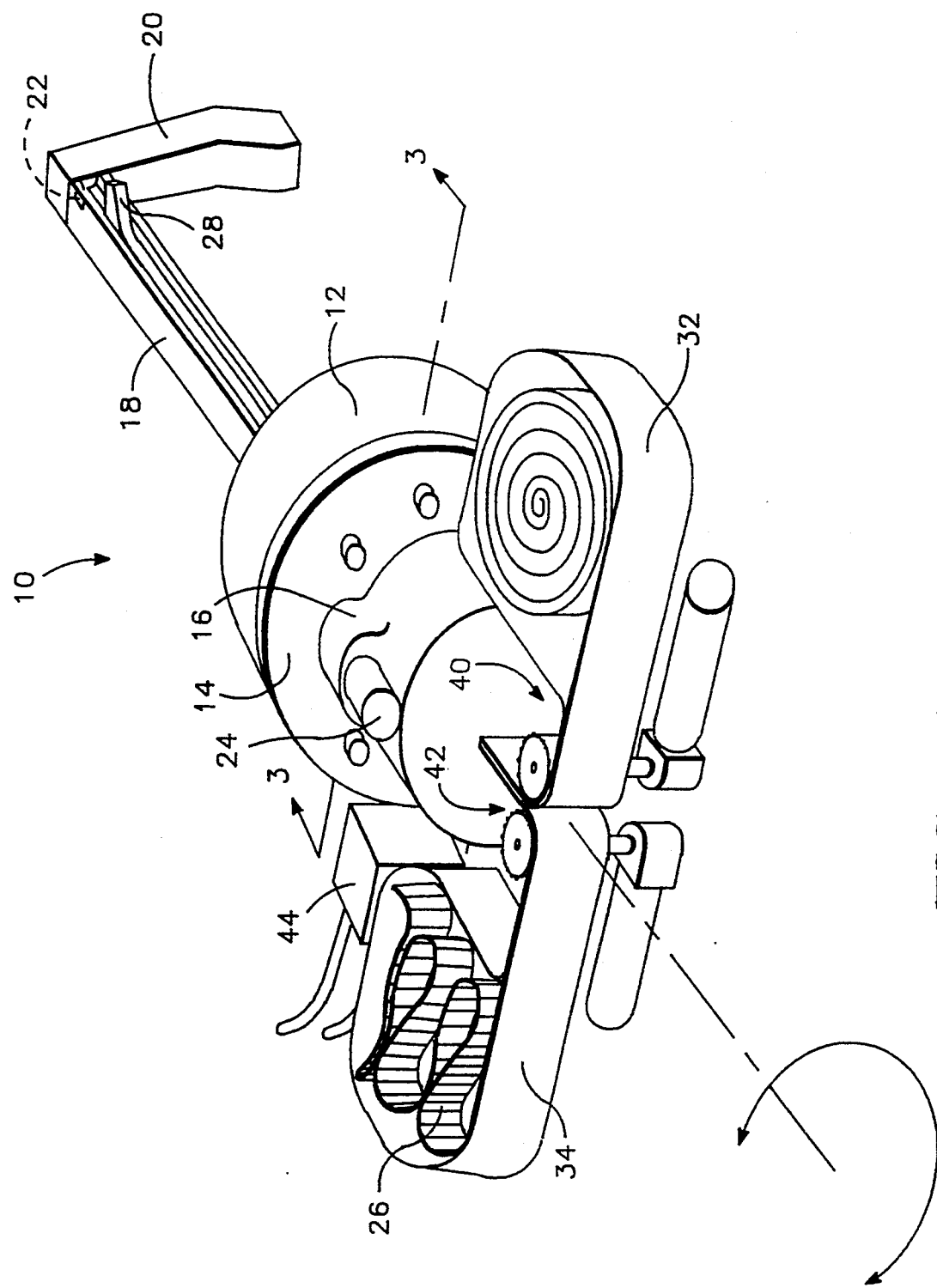
FIG. 1 is a perspective view of a sliding lance guide flexible lance system in accordance with the invention.

Turning now to the drawings, more particularly to FIGS. 1-4, there is shown a sliding lance guide flexible lance system 10 attached to a hand hole 12 of a nuclear power plant steam generator by means of flange 14 of tilt module 16. Details of the nuclear power plant steam generator useful for a further understanding of the invention are contained in the Ruggieri et al. parent application, the disclosure of which is hereby incorporated by reference herein. A rail 18 extends from the tilt module 16 to a support stand 20 in the blowdown lane 21 (FIG. 3) inside the steam generator. The rail 18 is attached to the stand 20 by a pivot 22 so that the rail 18 is free to rotate with the tilt module 16. A tilt drive motor 24 is attached to the tilt module 16.

Figure 2:
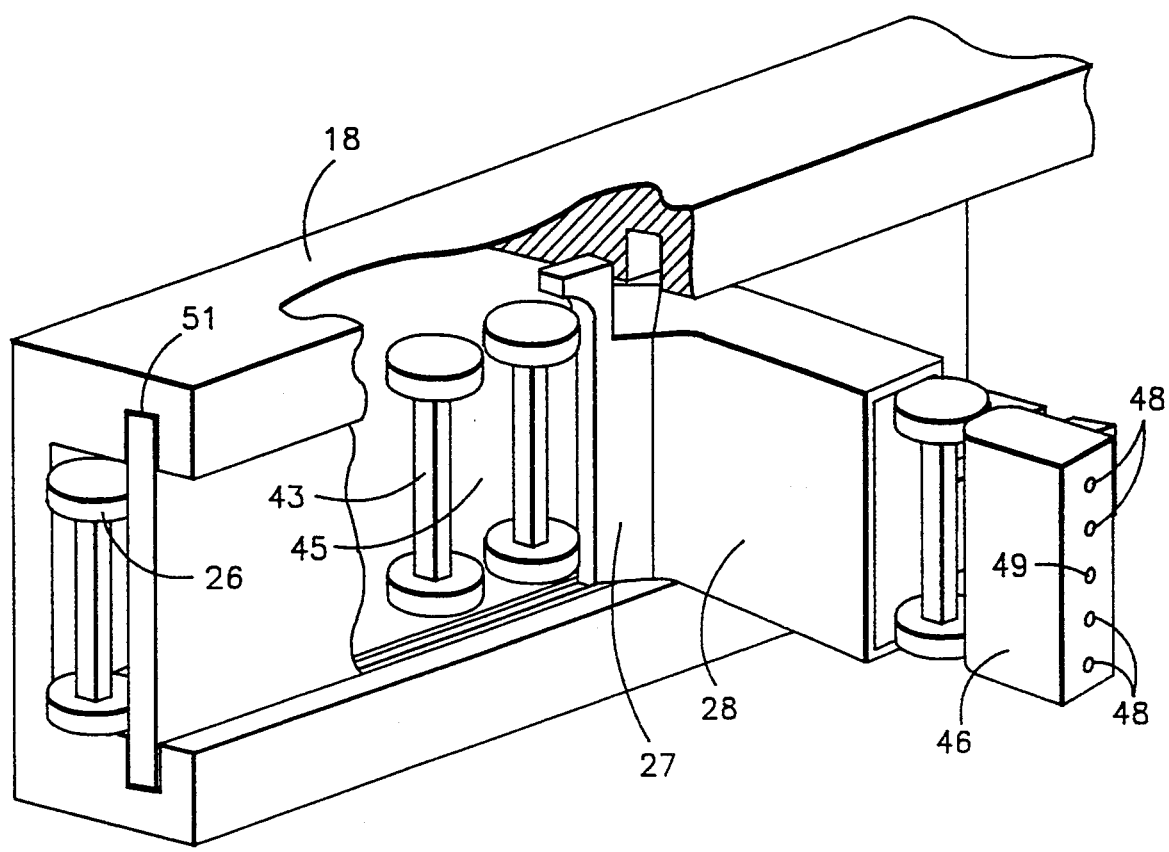
FIG. 2 is a perspective view of a portion of the sliding lance guide flexible lance system shown in FIG. 1, with a partial cutaway to show interior detail.

As is further shown in FIG. 2, a flexible lance 26 of the type described in the Ruggieri et al. parent application extends into the rail 18 for extension through a lance guide shoe 27 having a lance guide nose 28. The function of the lance guide shoe 27 is to deflect the lance off of the rail 18 and into the tube gap. The lance guide shoe 27 is slideably mounted in the rail 18, and is attached to a lance guide belt 30, which extends within and along the rail 18, through the tilt module 16, and into a lance guide belt accumulator 32 attached to support 33 (see also FIGS. 3-4). Similarly, the flexible lance 26 extends within and along the rail 18, through the tilt module 16, and into a flexible lance accumulator 34, also attached to the support 33. As is best shown in FIGS. 4 and 5, the support 33 is attached to the rail 18 by means of locking pin 35 through mating apertures 36 in interlocking projections 38. A lance guide belt sprocket drive 40 is mounted on the support 33 to engage sprocket holes 41 in the lance guide belt 30. A similar flexible lance sprocket drive 42 is mounted on the support 33 to engage hosebar supports 43 (FIG. 2) by means of spaces 45 between the hosebar supports 43 of the flexible lance 26. A lance manifold 44 is attached to the flexible lance accumulator 34 and is connected to the flexible lance 26 to supply pressurized water and other pressurized fluids to the flexible lance 26. The flexible lance 26 has a nozzle block 46 (FIG. 2) having a plurality of nozzles 48 for directing jets of the pressurized water against sludge deposits between tubes 50 (FIG. 3) of the steam generator. The nozzle block 46 also incorporates a miniature VideoProbe camera 49 connected to a cable extending through the flexible lance 26 and an optical fiber cable also extending through the flexible lance 26 for providing light to the field of view of the Videoprobe camera for inspecting the condition of the tubes 50 and the tube gaps.

The lance guide belt 30 is flexible, but stiff enough when captured in grooves 51 of the support rail 18 so that longitudinal force imparted to it is transmitted to the lance guide shoe 27, in order to move the lance guide shoe 27 forward and back on the rail 18. A suitable material for the lance guide belt 30 is 1/16 inch thick hard nylon plastic strap, available commercially under the trademark Delrin. The lance guide shoe 27 is also conveniently fabricated from the hard nylon plastic.

The tilt module 16, the lance guide belt drive 40 and the flexible lance drive 42 are all self-contained with their own DC motors, position sensors and power cables. The lance guide belt drive 40 and the flexible lance drive 42 incorporate two identical DC motors and position sensors. Drive sprockets and motors for the belt and lance drives 40 and 42 are geared so that the flexible lance 26 and the lance guide shoe 27 can have identical linear velocities and displacement control. Identical linear speed of the flexible lance 26 and the lance guide shoe 27 makes position control easier. The tilt module 16 incorporates a ring gear 52 (FIG. 4), through which the rail 18 is mounted.

The rail is made up of sections for installation with tight space restrictions in front of the hand hole 12 (outside the steam generator). The rail sections slip and pin together in the same manner as shown in FIGS. 4 and 5 for attaching the rail 18 to the support 33.

Figure 3:
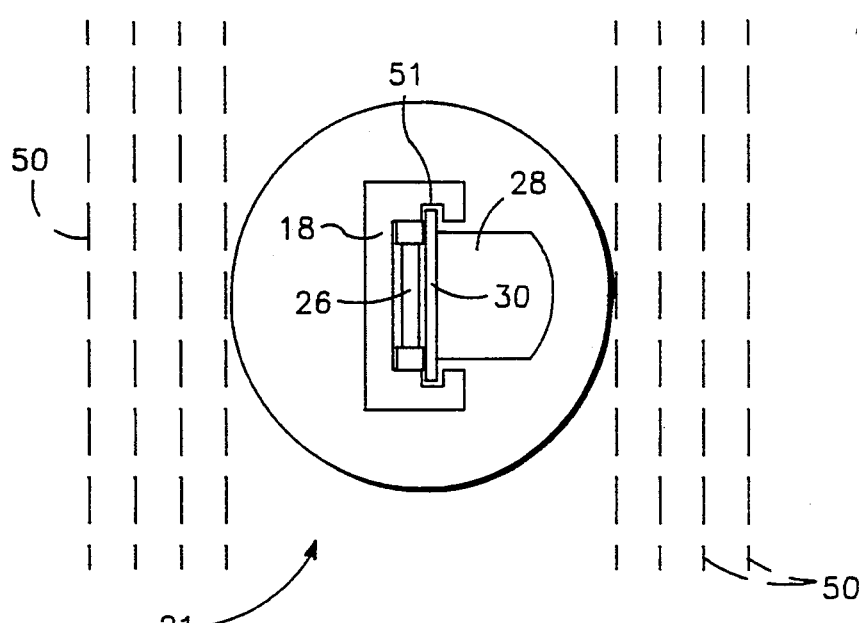
FIG. 3 is a cross section view, taken along the line 3—3 in FIG. 1.
Figure 4:
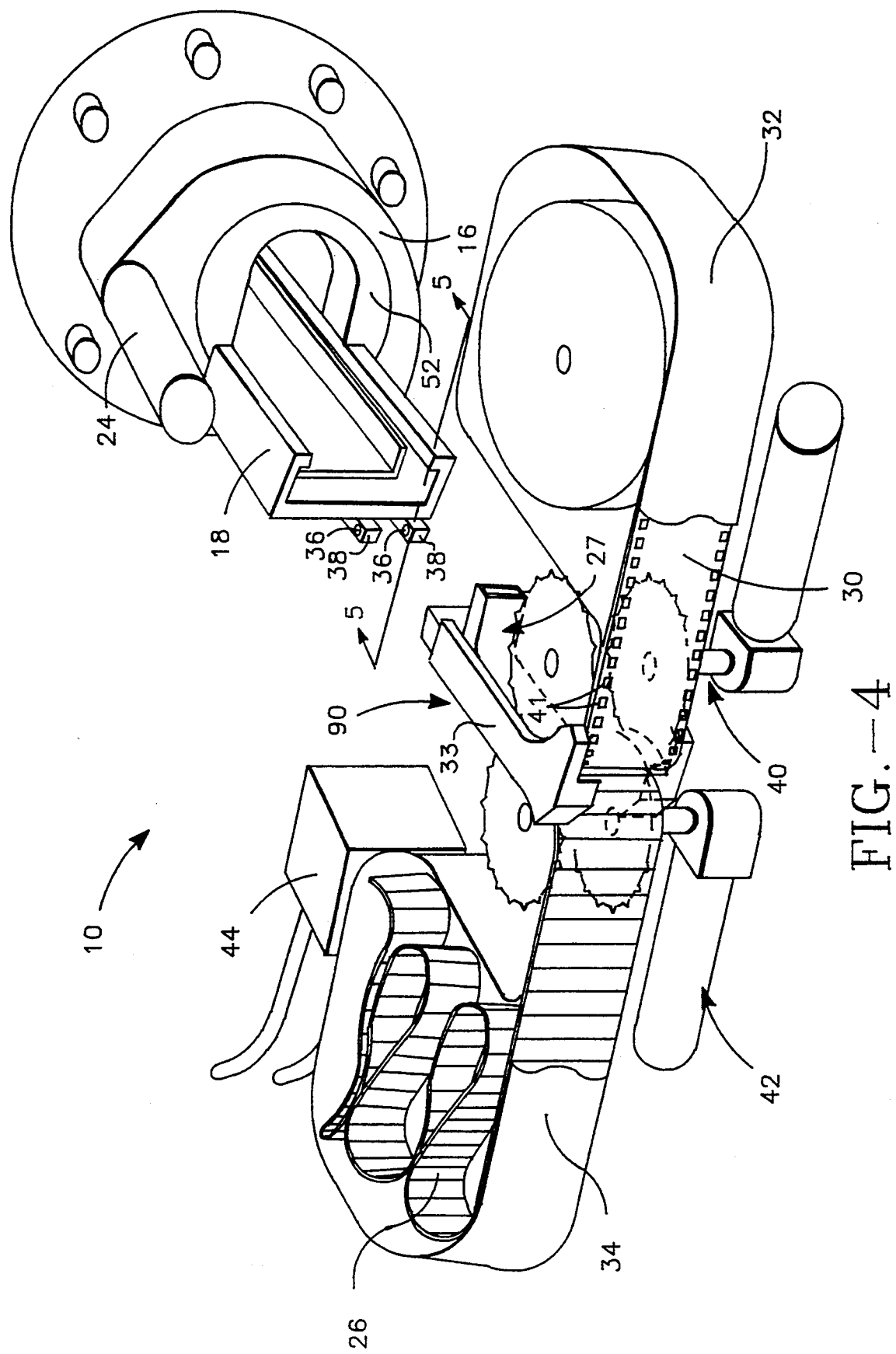
FIG. 4 is an exploded perspective view of the sliding lance guide flexible lance system shown in FIG. 1.

FIG. 6 shows another form of a lance guide shoe 60 that can be substituted for the lance guide shoe 27 in the FIGS. 1-5 embodiment. The lance guide shoe 60 includes a barrel spray unit 62 having a plurality of nozzles 64 which are used to spray soft sludge deposits between the tubes 50 from the blowdown lane 21 (FIG. 3). The barrel spray unit 62 is connected to a water line 65 which extends along the lance guide belt 30. In order to allow the lance guide shoe 60 to work in blow down lanes that vary in width, lance guide nose 66 comprises two pieces 68 and 70 that slide relative to each other, allowing the nose 66 distance to the tubes 50 to be adjusted. Movement of the nose 66 is accomplished by an air cylinder 72 connected between the barrel spray unit 66 and nose piece 68. Flexible lance guide member 74 receives the flexible lance 26 and is connected to the nose 66. The lance guide shoe 60 has apertures 76 for connection of the lance guide shoe to the lance guide belt 30.

FIG. 7 shows a sliding lance guide system 80 including the lance guide shoe 60. Typically, the flexible lance 18 is about 18 feet long and must be accumulated outside the hand hole 12 with restrictive space limitations. The accumulator 34 shown in FIG. 4 for the flexible lance 26 is one way to store portions of the flexible lance 26 not inside the steamgenerator. Such storage can also be provided, if there is sufficient space, outside and above the steam generator hand hole 12. The alternative lance storage arrangement 82 for the flexible lance 26 includes reel 83 positioned straight back from support 84 and extends upward from the system 80. Overhead, the take-up system 82 consists of pulley 85, weight 87 and a support framework (not shown) which provides constant tension of the lance 26 so that it does not become entangled. The same type of take-up system (not shown) is provided for the soft sludge hose 65. The take-up arrangement 82 is used when there are no overhead restrictions above the hand hole 12. If such overhead restrictions prevent use of the take-up 82, the flexible lance accumulator 34 can be used. Flexible lance drive 86 has three sprocket wheels 88 for driving the flexible lance 26 through the lance guide shoe 60 and retracting it from the lance guide shoe 60. The lance drive belt 30 and the soft sludge hose 65 typically are about one-half the length of the flexible lance 26 and are easily accommodated in the lance drive belt accumulator 32 if an overhead take-up is not employed for the soft sludge hose 65. Other than as shown and described, the construction and operation of the FIGS. 6-7 embodiment of the invention is the same as that of the FIGS. 1-5 embodiment.

Further details of the flexible lance 26 are shown in FIGS. 8-10. High pressure hoses 134, nitrogen purge line 136 and VideoProbe fiber optics cable 132 are supported by the plurality of separate spacerless hosebar structures 43. The hosebar structures 43 are integrally formed from a flexible plastic material, such as a hard nylon (available under the trademark Delrin) in a single piece. The hosebar structures 43 include upper and lower, faceted, longitudinally extending separate, faceted shapes 148 defining strips 140 and 142 enclosing flexible safety cables 144 and 146, which provide structural strength to the flexible lance 26. Each repeating faceted shape 148 of the strips 140 or 142 is connected to an opposing faceted shape 148 on the other strip 142 or 140 by a vertical bar 150. The vertical bars 150 have passages 152 through which the hoses 134, cable 132 and line 136 pass. The vertical bars 150 define slots 154 beside the strips 140 and 142, which interact with sprocket wheels for driving the flexible lance 26 through the lance guide 27.

End hosebar structure 43 is attached to the nozzle block 46 on the front of the flexible lance 26. The nozzle block 46 has a plurality of removable, precision machined, high pressure orifices 48 connected to the high pressure water hoses 134 to provide water jets 160 for removing the sludge deposits. The middle water jets 160 converge for maximum sludge removal effect. A nitrogen nozzle 162 is directed at lens 164 of VideoProbe camera system 49. The fiber optics cable 132 of the VideoProbe camera system 49 provides illumination from a remote light source for making an area adjacent to the nozzle block 46 inside the tube bundle visible.

In use of the systems 10 and 80, rail 18 is sectioned and installed as sections, each of a length dependent on the space available in front of the hand hole 12 outside the steam generator. The tilt module 16 is attached to the hand hole flange after the rail 18 has been installed. Lance and belt drive module 90 or 92 containing the support 33 or 84, flexible lance drive 42 or 86, the lance guide belt drive 40, and the accumulators 30 and 34 or take-up 82 for the flexible lance 26, the lance guide belt 30 and the soft sludge hose 65 is attached to the rail 18. The lance guide shoe 27 or 60 resides with the lance and belt drive module 90 or 92, as shown in FIG. 7 for the lance guide shoe 60, ready to move down the rail 18 once the module 90 or 92 is attached to the rail 18. Once all manifold lines, video lines, power and control cables are attached, the system 10 or 80 is ready to function. The lance guide shoe 27 or 60 line the flexible lance 26 up with the tube gap, and while the lance guide shoe 27 or 60 is held stationary, the flexible lance 26 is pushed into the tube gap. After the flexible lance 26 is pulled back into the lance guide shoe 27 or 60, the lance guide shoe 27 or 60 moves on to the next tube gap.

It should now be readily apparent to those skilled in the art that a novel flexible lance system for accessing assemblies having a difficult to access geometries capable of achieving the stated objects of the invention has been provided. The flexible lance system for accessing such difficult to access geometries as steam generators of nuclear power plants is universally applicable to different steam generators and other difficult to access geometries. The flexible lance system is usable with smaller access holes to the steam generators and other difficult to access geometries than previous flexible lance systems. In this flexible lance system it is not necessary to insert drive motors or sensors for the system inside the steam generator or other difficult to access geometry. With this flexible lance system the flexible lance is inserted into the steam generator within, rather than suspended from, a support rail.

It should further be apparent to those skilled in the art that various changes in form and details of the invention as shown and described may be made. For example, the systems 10 and 80 can be used with a flexible lance incorporating a foreign object search and retrieval apparatus as described in the above Jens et al. parent applications. It is intended that such changes be included within the spirit and scope of the claims appended hereto.

What is claimed is:

1. A flexible lance system comprising, in combination, a flexible means for accessing an assembly having a difficult to access geometry, which comprises a flexible member having a distal end, said flexible member being configured to be driven into the difficult to access geometry, a support rail, a rigid guide extending lengthwise of said flexible member and being mounted within said support rail, said flexible member being movably mounted along said rigid guide, said rigid guide having an end positioned to turn said flexible member in a predetermined angle with respect to an extending direction of said flexible member as said flexible member passes from said rigid guide through said end, a first drive means external of the assembly having the difficult to access geometry for driving said flexible member through said rigid guide, and a second drive means external of the assembly having the difficult to access geometry for driving said rigid guide along said support rail.

2. The system of claim 1 in which said rigid guide is slideably mounted in said support rail.

3. The system of claim 2 in which said second drive means comprises a flexible belt connected to said rigid guide and having sufficient stiffness when captured in said support rail so that longitudinal force imparted to said flexible belt is transmitted to said rigid guide.

4. The system of claim 3 in which said first drive means comprises a first drive motor and a first sprocket drive positioned along said flexible member.

5. The system of claim 4 additionally comprising a first accumulator for said flexible member adjacent to said first drive means.

6. The system of claim 5 in which said second drive means comprises a second drive motor and a second sprocket drive positioned along said flexible belt.

7. The system of claim 6 additionally comprising a second accumulator for said flexible belt adjacent to said second drive means.

8. The system of claim 6 in which said first and second drive motor and said first and second sprocket drive are configured so that said flexible member and said flexible belt can have the same linear velocities and position controls.

9. The system of claim 6 additionally comprising a rotatable member, said support rail being fixedly attached to said rotatable member, and a third drive means external of the assembly having the difficult to access geometry connected to rotate said rotatable member.

10. The system of claim 9 additionally comprising a means for attaching said rotatable member at an access opening for said assembly having a difficult to access geometry.

11. The system of claim 9 additionally comprising a support stand, said support rail being pivotally connected to said support stand remote from said rotatable member.

12. The system of claim 1 in which said flexible member comprising separate segments strung on at least one flexible cable which runs the length of the flexible member.

13. The system of claim 1 additionally comprising a nozzle block at the distal end of said flexible member, said nozzle block having a first plurality of nozzles for directing pressurized water at a desired location within said assembly having a difficult to access geometry, and a first pressurized water line extending longitudinally along said flexible member.

14. The system of claim 13 additionally comprising a spray unit attached to said rigid guide and having a second plurality of nozzles for directing water at a second desired location within said assembly having a difficult to access geometry, and a second pressurized water line connected to said spray unit.

15. The system of claim 1 in which said support rail comprises a plurality of linked together sections.

16. The system of claim 1 in which said rigid guide includes a laterally extending nose through which said flexible member extends.

17. The system of claim 16 in which an extending direction of said nose is adjustable.

18. The system of claim 1 additionally comprising an optical cable extending lengthwise along and within said flexible member for illuminating a portion of the difficult to access geometry, a video cable, and a video camera connected to said video cable at the distal end of said flexible member for forming an image of a scene visible from the distal end of said flexible member for transmission by said video cable.

* * * * *